United States Patent
Xin-LeBlanc

(10) Patent No.: US 7,982,445 B1
(45) Date of Patent: Jul. 19, 2011

(54) SYSTEM AND METHOD FOR CONTROLLING OVERSHOOT AND UNDERSHOOT IN A SWITCHING REGULATOR

(75) Inventor: Jane Xin-LeBlanc, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 591 days.

(21) Appl. No.: 11/983,352

(22) Filed: Nov. 8, 2007

(51) Int. Cl.
G05F 1/40 (2006.01)

(52) U.S. Cl. .......................... 323/282; 323/284

(58) Field of Classification Search .......... 323/282–286, 323/288, 351
See application file for complete search history.

(56) References Cited

U.S. PATENT DOCUMENTS

| | | | |
|---|---|---|---|
| 5,408,172 A | 4/1995 | Tanimoto et al. | |
| 5,422,562 A | 6/1995 | Mammano et al. | |
| 5,963,439 A | 10/1999 | Wuidart et al. | |
| 6,140,808 A | 10/2000 | Massie | |
| 6,897,715 B2 | 5/2005 | Barber, Jr. et al. | |
| RE38,891 E | 11/2005 | Danstrom | |
| 7,221,213 B2 | 5/2007 | Lee et al. | |
| 7,233,134 B2 | 6/2007 | Huang et al. | |
| 7,570,036 B2 * | 8/2009 | Tang et al. | 323/283 |
| 2002/0125869 A1 * | 9/2002 | Groom et al. | 323/283 |
| 2002/0125872 A1 * | 9/2002 | Groom et al. | 323/288 |
| 2006/0055385 A1 * | 3/2006 | Schiff | 323/282 |
| 2007/0103132 A1 * | 5/2007 | Hendrix et al. | 323/282 |
| 2007/0176588 A1 * | 8/2007 | Nishida | 323/284 |
| 2008/0252277 A1 * | 10/2008 | Sase et al. | 323/283 |
| 2009/0067199 A1 * | 3/2009 | Van Der Wal et al. | 363/16 |
| 2009/0167271 A1 * | 7/2009 | Tang et al. | 323/283 |
| 2009/0261795 A1 * | 10/2009 | Tang et al. | 323/283 |

OTHER PUBLICATIONS

Xiancheng Wang, et al., "Transient Response Improvement in Isolated DC-DC Converter with Current Injection Circuit," 2005 IEEE, pp. 706-710.

* cited by examiner

Primary Examiner — Adolf Berhane

(57) ABSTRACT

A system and a method are disclosed for controlling overshoot and undershoot in a switching regulator circuit. A first comparator circuit for controlling an undershoot of an output voltage of the switching regulator circuit is provided that that detects an occurrence of an undershoot of the output voltage of the switching regulator circuit and activates a first current source to pull up the output voltage of the switching regulator circuit. A second comparator circuit for controlling an overshoot of an output voltage of the switching regulator circuit is provided that detects an occurrence of an overshoot of the output voltage of the switching regulator circuit and activates a second current source to pull down the output voltage of the switching regulator circuit.

23 Claims, 8 Drawing Sheets

SYSTEM AND METHOD FOR CONTROLLING OVERSHOOT AND UNDERSHOOT IN A SWITCHING REGULATOR

TECHNICAL FIELD OF THE INVENTION

The present invention is generally directed to the semiconductor circuits and, in particular, to a system and method for controlling overshoot and undershoot in a switching regulator.

BACKGROUND OF THE INVENTION

When a load is suddenly reduced or suddenly increased in a switching regulator, the value of the output voltage usually exhibits an overshoot in value or an undershoot in value. The magnitude of the overshoot or undershoot depends on the size of various elements of the regulator. For example, the magnitude of the overshoot or undershoot may depend on the size of the inductor, the size of the output capacitor, the equivalent series resistance (ESR) of the output capacitor, the switching regulator control loop bandwidth and the switching frequency.

Using smaller sized inductors and larger sized capacitors generally minimizes the magnitude of the overshoot or undershoot. Design requirements, however, generally call for smaller sized capacitors to be used. There are also certain disadvantages in using smaller sized inductors. Reducing the size of an inductor creates larger ripple currents. Increasing the switching frequency reduces the efficiency of the switching regulator.

Therefore, there is a need in the art for a system and method that is capable of improving the performance of a switching regulator. There is a need in the art for a system and method that is capable of reducing the magnitude of a transient overshoot or a transient undershoot in a switching regulator without having to change the switching regulator control loop components, the control loop bandwidth or the switching frequency.

SUMMARY OF THE INVENTION

To address the above-discussed deficiencies of the prior art, it is a primary object of the present invention to provide a system and method for improving the performance of a switching regulator to reduce the magnitude of a transient overshoot or a transient undershoot when the size of a load is suddenly reduced or increased.

One advantageous embodiment of the invention comprises a first comparator circuit that is capable of detecting an undershoot condition in the output voltage of a switching regulator and a second comparator circuit that is capable of detecting an overshoot condition in the output voltage of the switching regulator. Upon detecting an undershoot condition the first comparator circuit activates a first power transistor that pulls up the output voltage to stop the undershoot condition from undershooting any further. Upon detecting an overshoot condition the second comparator circuit activates a second power transistor that pulls down the output voltage to stop the overshoot condition from overshooting any further.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as future uses, of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
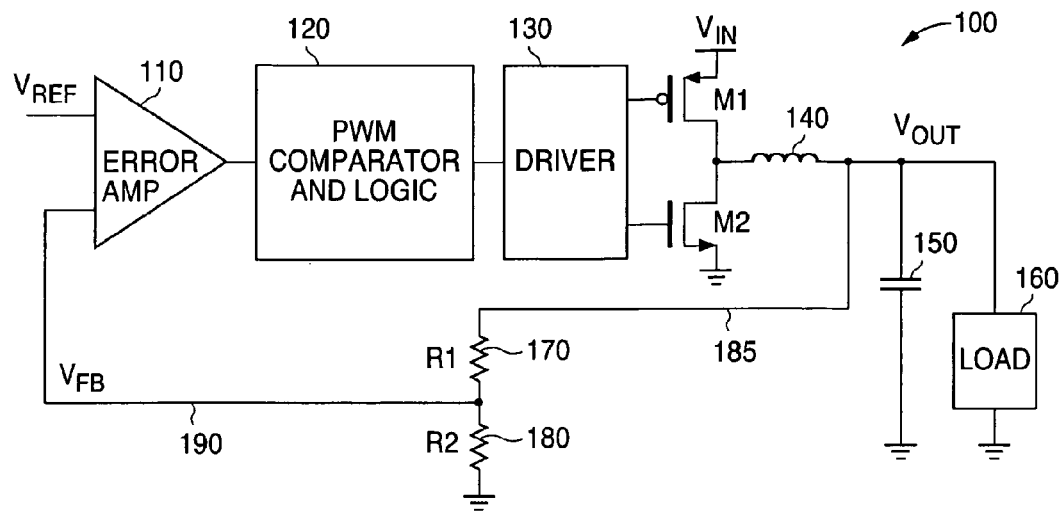
FIG. 1 illustrates a schematic diagram of an exemplary prior art switching regulator.

FIGS. 1 through 7 and the various embodiments used to describe the principles of the present invention in this patent document are by way of illustration only and should not be construed in any way to limit the scope of the invention. Those skilled in the art will understand that the principles of the present invention may be implemented in any type of suitably arranged switching regulator.

To simplify the drawings the reference numerals from previous drawings will sometimes not be repeated for structures that have already been identified.

FIG. 1 illustrates a typical prior art switching regulator 100. The switching regulator 100 comprises an error amplifier 110, a pulse width modulation (PWM) comparator and logic unit 120, and a driver unit 130 connected as shown in FIG. 1. A first input to the error amplifier 110 receives a reference voltage $V_{REF}$. A first output of the driver unit 130 is connected to the gate of a p-type metal oxide semiconductor (PMOS) transistor M1. A second output of the driver unit 130 is connected to the gate of an n-type metal oxide semiconductor (NMOS) transistor M2. Transistor M1 and transistor M2 are synchronous power switches. The source of transistor M1 is connected to a power source $V_{IN}$ and the source of transistor M2 is connected to ground.

The drains of transistor M1 and transistor M2 are each connected to a first end of inductor 140. The output voltage $V_{OUT}$ is the voltage value that appears at the second end of the inductor 140. The second end of inductor 140 is connected to a first end of load 160. The second end of load 160 is connected to ground. An output capacitor 150 is connected in parallel with the load 160. The output capacitor 150 has a first end that is connected between the second end of the inductor 140 and the load 160. The second end of the output capacitor 150 is connected to ground.

As shown in FIG. 1, a feedback line 185 that is connected to the second end of the inductor 140 provides the output voltage to the first end of a first feedback resistor 170 (resistor R1). The second end of the first feedback resistor 170 is connected to a first end of a second feedback resistor 180 (resistor R2). The second end of the second feedback resistor 180 is connected to ground. A feedback line 190 is connected to the second end of the resistor 170 and to the first end of the resistor 180. The output voltage $V_{OUT}$ is divided by the feedback resistors (170 and 180) and the resulting signal tap is fed back to a second input of the error amplifier 110 as feedback signal $V_{FB}$. The feedback lines 185 and 190 form a control loop for the error amplifier 110 that keeps the signal tap value at the same voltage potential as the reference voltage $V_{REF}$.

The operation of prior art switching regulator 100 is well known in the art. When the magnitude of the load 160 is suddenly reduced or suddenly increased, the value of the output voltage $V_{OUT}$ usually exhibits an overshoot in value or an undershoot in value. To minimize the magnitude of the overshoot in value the invention provides a pull-down device at the output of the switching regulator. To minimize the magnitude of the undershoot in value the invention provides a pull-up device at the output of the switching regulator.

Figure 2:
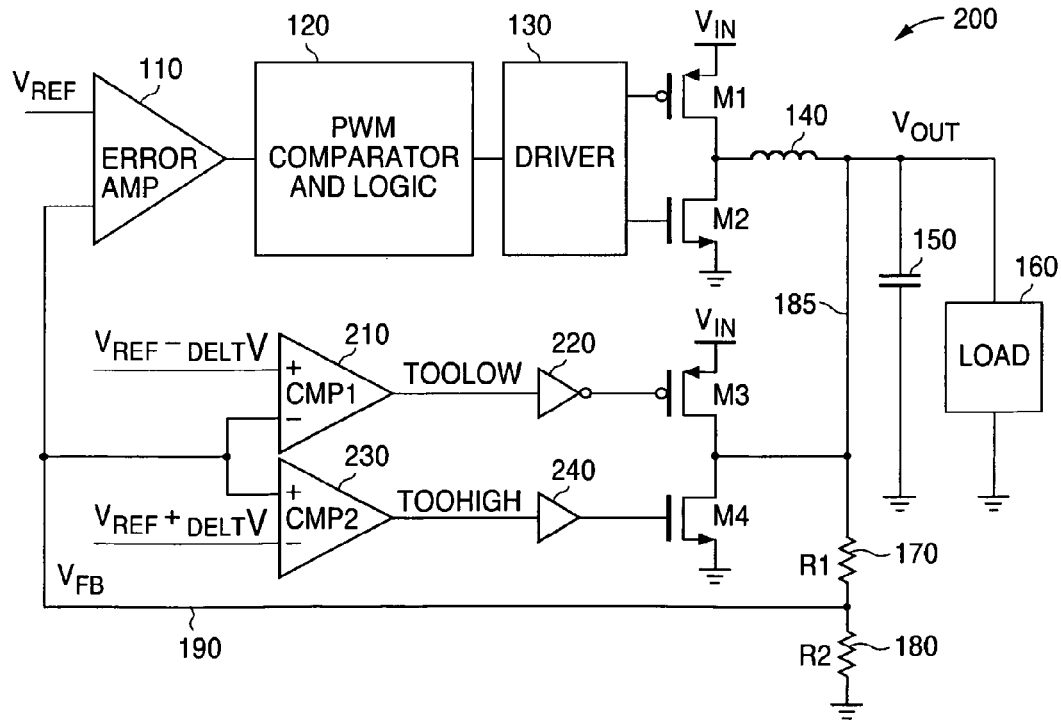
FIG. 2 illustrates a schematic diagram of an advantageous embodiment of a switching regulator of the invention.

FIG. 2 illustrates a schematic diagram of an advantageous embodiment of a switching regulator 200 in accordance with the principles of the present invention. The switching regulator 200 that is shown is FIG. 2 comprises many of the same elements as the prior art switching regulator 100 that is shown in FIG. 1. The structure and function of the elements that the switching regulator 200 of the invention has in common with the prior art switching regulator 100 have already been described.

Switching regulator 200 also comprises a first comparator circuit 210 (designated CMP1 and sometimes simply referred to as comparator 210) and a second comparator circuit 230 (designated CMP2 and sometimes simply referred to as comparator 230) connected as shown in FIG. 2.

A non-inverting input of comparator 210 receives a value of voltage that is equal to the reference voltage $V_{REF}$ minus a selected value of voltage (designated delta V or DELT V). The inverting input of comparator 210 receives the tap signal voltage that is present on feedback line 190. The output of comparator 210 is provided to an inverter circuit 220. The output of the inverter circuit 220 is provided to the gate of a p-type metal oxide semiconductor (PMOS) transistor M3.

An inverting input of comparator 230 receives a value of voltage that is equal to the reference voltage $V_{REF}$ plus a selected value of voltage (designated delta V or DELT V). The non-inverting input of comparator 230 receives the tap signal voltage that is present on feedback line 190. The output of comparator 230 is provided to a buffer circuit 240. The buffer circuit 240 delays the signal from comparator 230 sufficiently to compensate for the time that the signal from comparator 210 spends traversing the inverter circuit 220. The output of the buffer circuit 240 is provided to the gate of an n-type metal oxide semiconductor (NMOS) transistor M4.

Transistor M3 and transistor M4 are synchronous power switches. The source of transistor M3 is connected to the power source $V_{IN}$ and the source of transistor M4 is connected to ground. The drains of transistor M3 and transistor M4 are each connected to the voltage output at the second end of the inductor 140.

When the value of the tap signal on feedback line 190 is greater than the sum of the reference voltage $V_{REF}$ plus the selected value of voltage DELT V (i.e., the tap signal is greater than $V_{REF}$+DELT V), then an overshoot condition is detected. This causes comparator 230 to assert and to turn on transistor M4. When transistor M4 turns on it will pull down the output voltage $V_{OUT}$ and prevent the output voltage $V_{OUT}$ from overshooting any further. That is why the signal line from comparator 230 to transistor M4 is designated in FIG. 2 as the "TOOHIGH" line.

In the case of a sudden load transient from a high load level to a low load level, the inductor current can not be reduced instantaneously. The excess inductor current will be diverted to ground by transistor M4.

Conversely, when the value of the tap signal on feedback line 190 is less than the reference voltage $V_{REF}$ minus the selected value of voltage DELT V (i.e., the tap signal is less than $V_{REF}$-DELT V), then an undershoot condition is detected. This causes comparator 210 to assert and to turn on transistor M3. When transistor M3 turns on it will pull up the output voltage $V_{OUT}$ and prevent the output voltage $V_{OUT}$ from undershooting any further. That is why the signal line from comparator 210 to transistor M3 is designated in FIG. 2 as the "TOOLOW" line.

In the case of a sudden load transient from a low load level to a high load level, the inductor current can not be increased instantaneously. The additional current necessary to prevent $V_{OUT}$ from undershooting will be provided by transistor M3.

Figure 3:
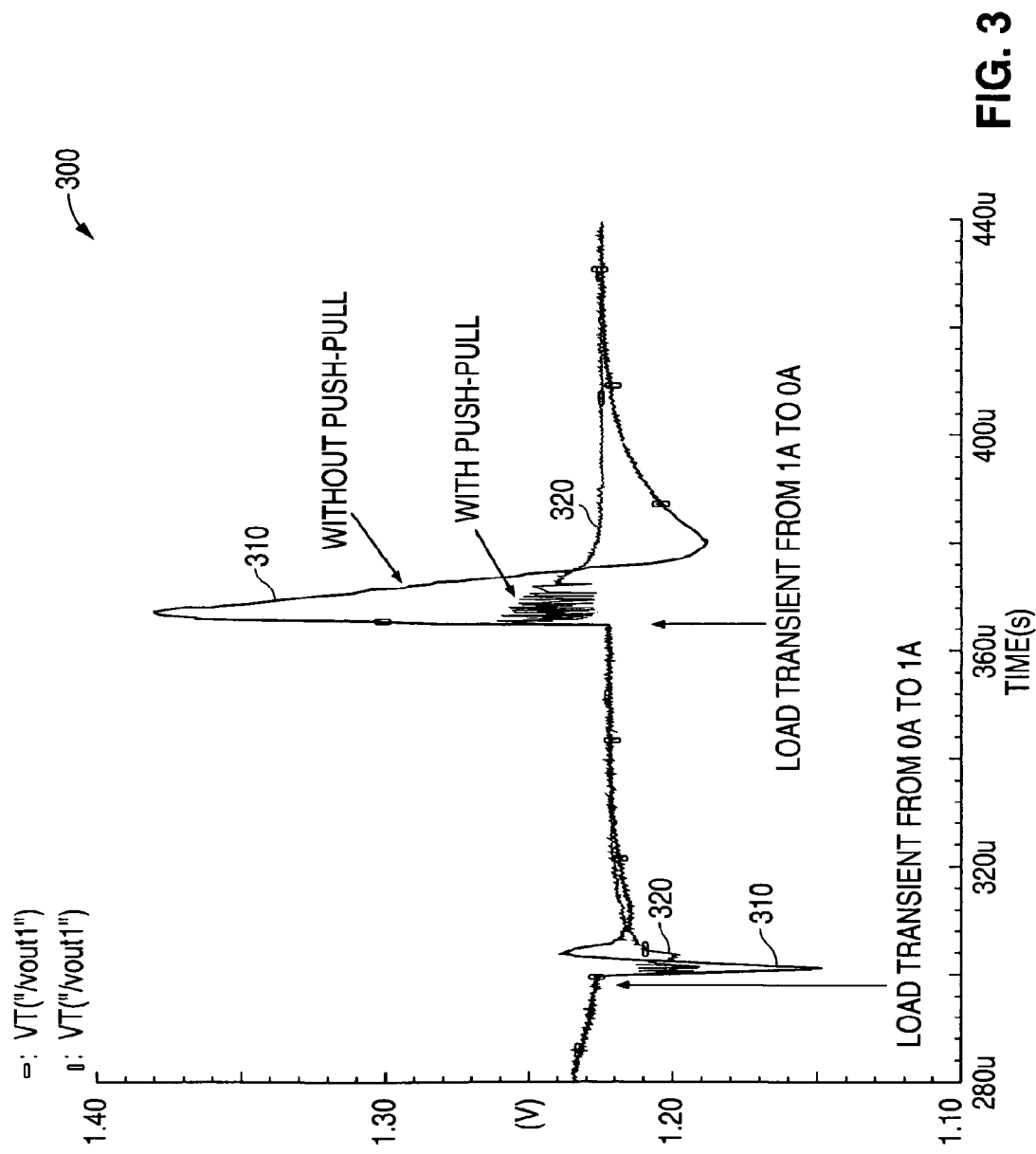
FIG. 3 illustrates a graph of output voltage versus time showing an exemplary load transient when a load increases and an exemplary load transient when a load decreases for a prior art switching regulator and for a switching regulator of the invention.

FIG. 3 illustrates a graph 300 of output voltage versus time. The left hand portion of FIG. 3 shows a load transient when an exemplary load increases from zero (0) Ampere to one (1) Ampere. The right hand portion of FIG. 3 shows a load transient when an exemplary load decreases from one (1) Ampere to zero (0) Ampere.

The vertical axis of the graph 300 represents an output voltage (V). The scale of the vertical axis extends from a value of one and one tenth volts (1.10) to a value of one and four tenths volts (1.40). The horizontal axis of the graph 300 represents time is microseconds (μs). The scale of the horizontal axis extends from a value of two hundred eighty microseconds (280 μs) to four hundred forty microseconds (440 μs).

The line 310 represents the response of the prior art switching regulator 100 to the changes in load. The prior art line 310 is designated as "without push-pull." The line 320 represents the response of the switching regulator 200 of the invention to the changes in load. The line 320 of the invention is designated "with push-pull." The term "push-pull" refers to the operation of the pull-up device and the operation of the pull-down device of the invention.

When the load increases from zero (0) Ampere to one (1) Ampere, the undershoot of the prior art switching regulator 100 drops from about one and twenty three hundredths volt (1.23 V) to a low value of about one and fifteen hundredths volt (1.15 V). As shown in FIG. 3, the prior art switching regulator 100 also generates an overshoot response after the undershoot.

The undershoot of the switching regulator 200 of the invention drops from about one and twenty three hundredths volt (1.23 V) to a low value of about one and nineteen hundredths volt (1.19 V) with an oscillation in a range from about one and nineteen hundredths volt (1.19 V) to about one and twenty one hundredths volt (1.21 V).

When the load decreases from one (1) Ampere to zero (0) Ampere, the overshoot of the prior art switching regulator 100 increases from about one and twenty two hundredths volt (1.22 V) to a high value of about one and thirty eight hundredths volt (1.38 V). As shown in FIG. 3, the prior art switching regulator 100 also generates an undershoot response after the overshoot.

The overshoot of the switching regulator 200 of the invention increases from about one and twenty two hundredths volt (1.22 V) to a high value of about one and twenty six hundredths volt (1.26 V) with an oscillation in a range from about one and twenty three hundredths volt (1.23 V) to about one and twenty six hundredths volt (1.26 V).

Figure 4A:
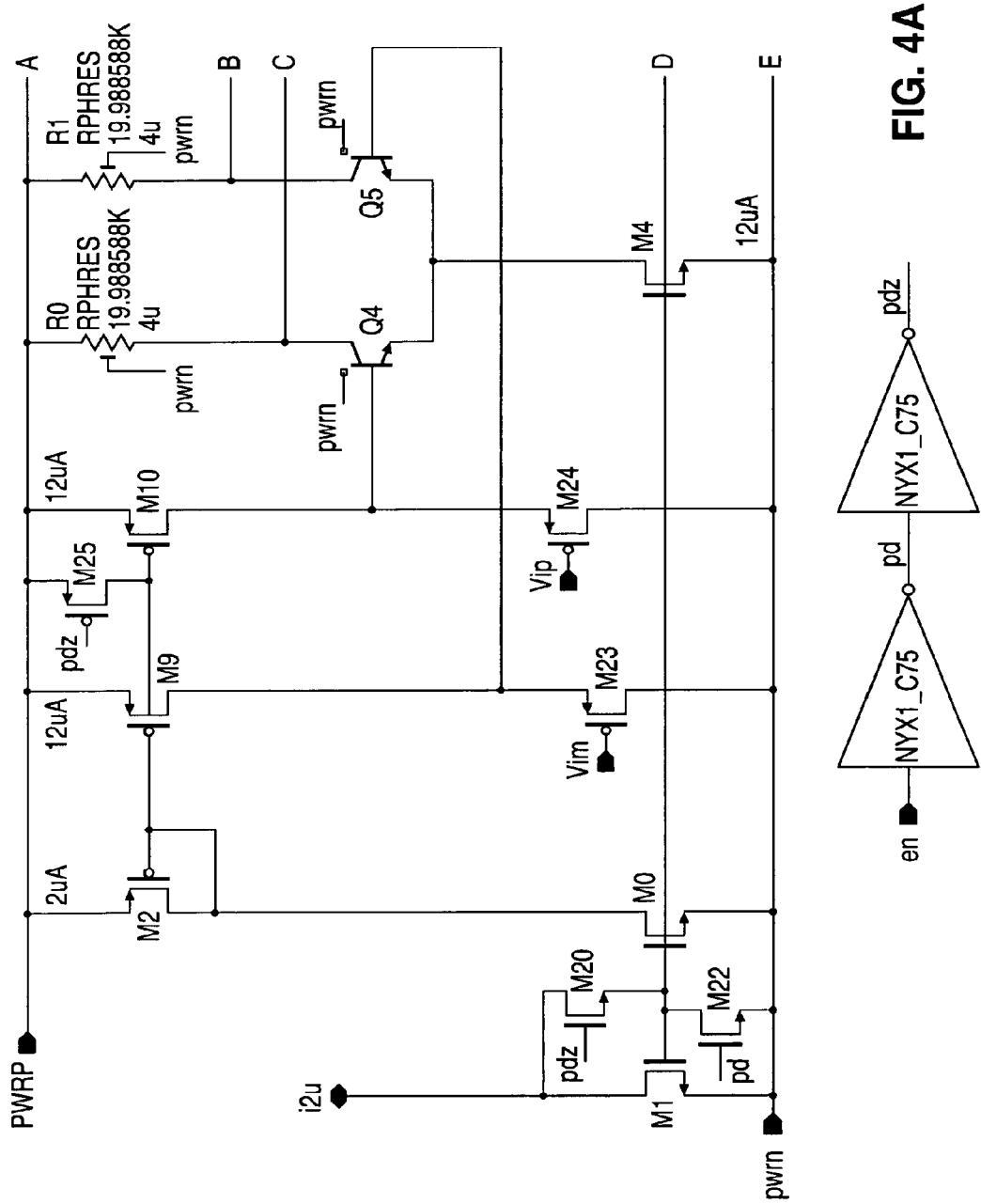
FIGS. 4A and 4B illustrate a schematic diagram of an advantageous embodiment of a first comparator circuit of the invention.
Figure 4B:
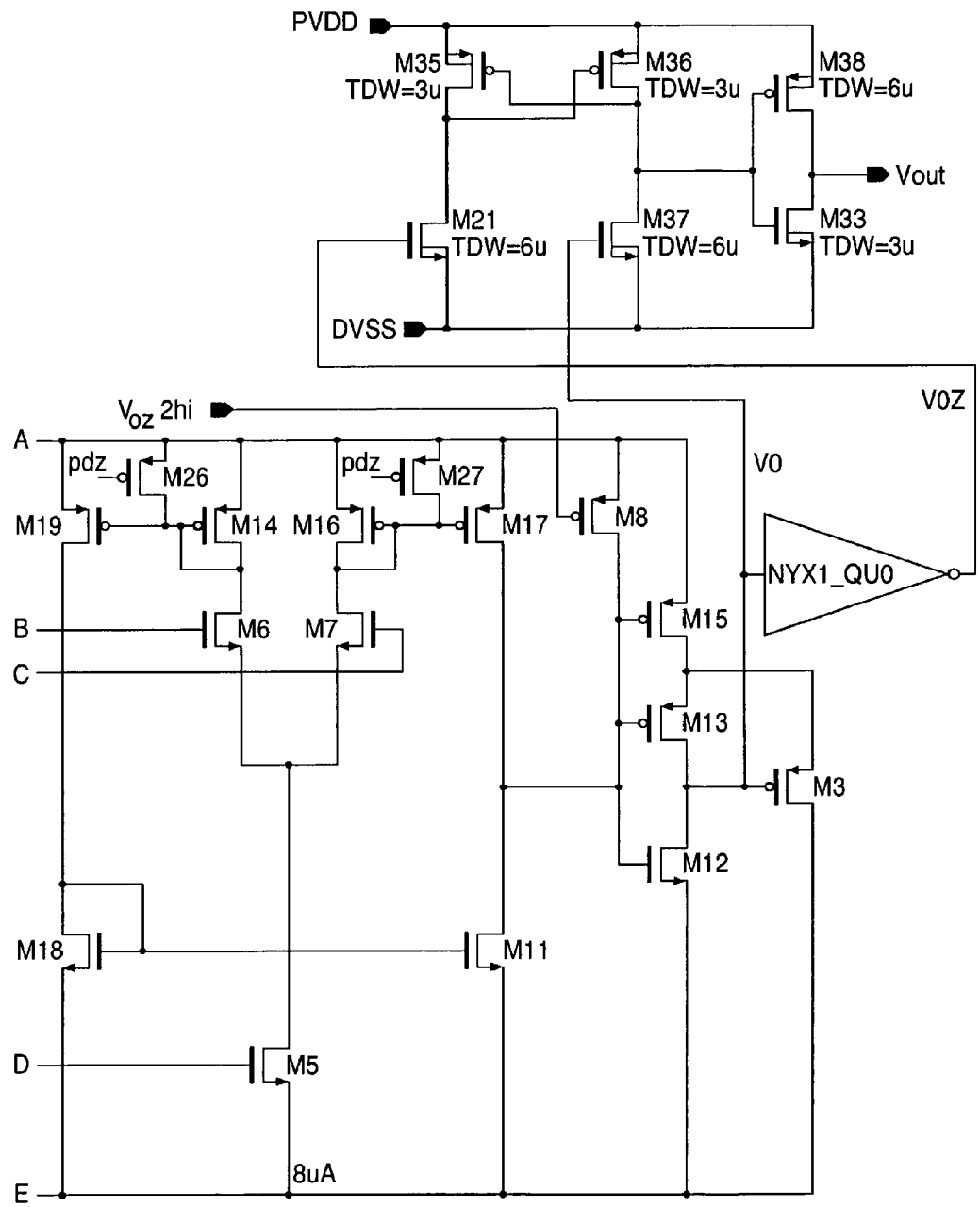

FIGS. 4A and 4B illustrate a schematic diagram of an advantageous embodiment of the first comparator circuit 210 of the invention. In FIGS. 4A and 4B the Vip node is connected to the $V_{REF}$–DELT V input and the Vim node is connected to the tap signal on feedback line 190. The first stage of comparator 210 comprises p-type metal oxide semiconductors (PMOS) source followers that prevent the operation of comparator 210 from glitching the sensitive reference signals.

The first stage of comparator 210 is followed by two fast, high gain stages. To prevent comparator 210 and comparator 230 from being asserted at the same time, the output of comparator 230 is fed back to the comparator 210 via a Voz2hi input. When the output of comparator 230 is high, then the output of comparator 210 is forced low.

The first stages of the comparator 210 are powered using the quiet power supply. Transistor M3 is connected to the power supply $V_{IN}$. There is a supply level shifter at the output of the comparator 210 to prevent transistor M3 from being accidentally turned on due to switching noises.

Figure 5A:
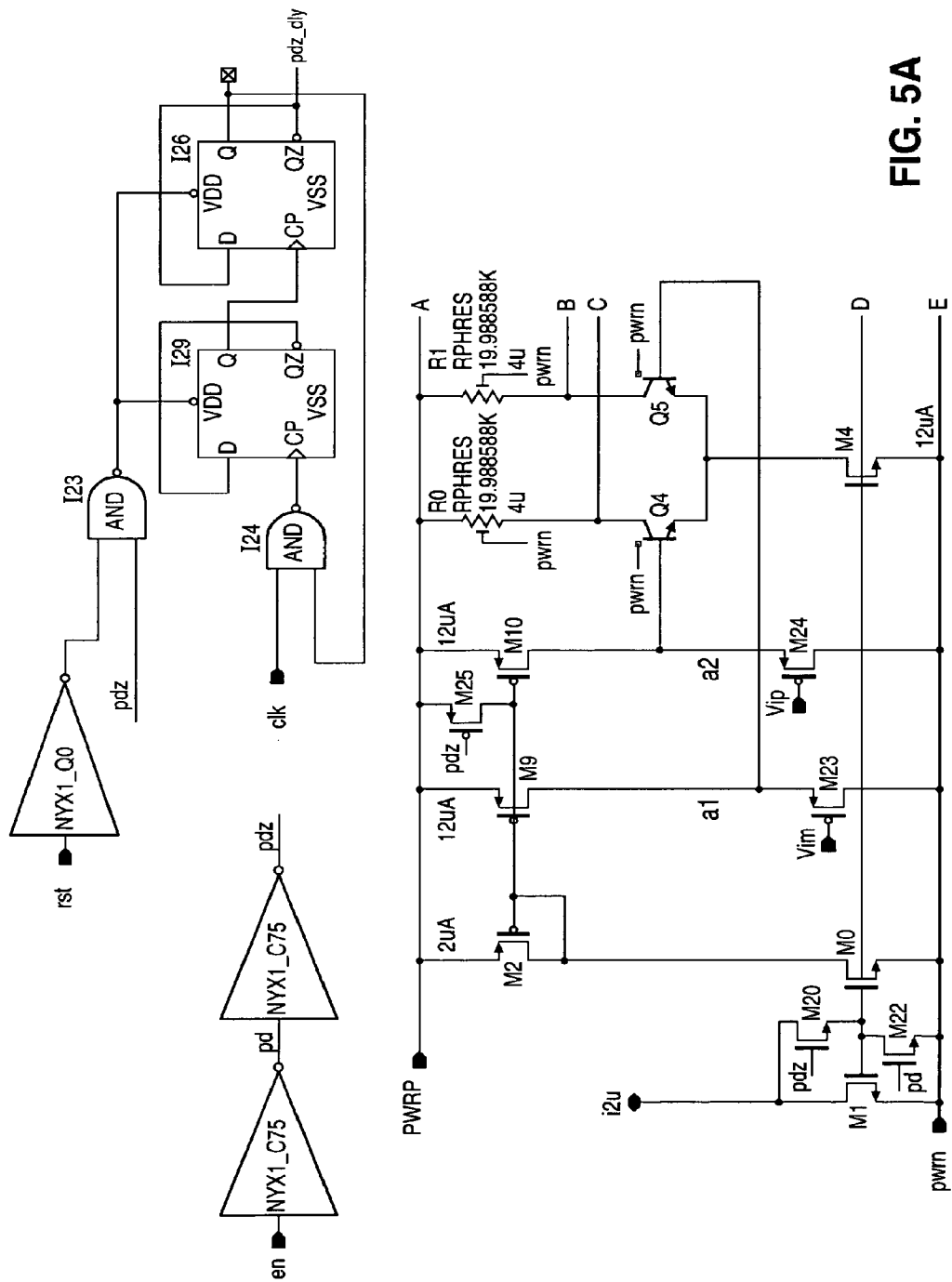
FIGS. 5A and 5B illustrate a schematic diagram of an advantageous embodiment of a second comparator circuit of the invention.
Figure 5B:
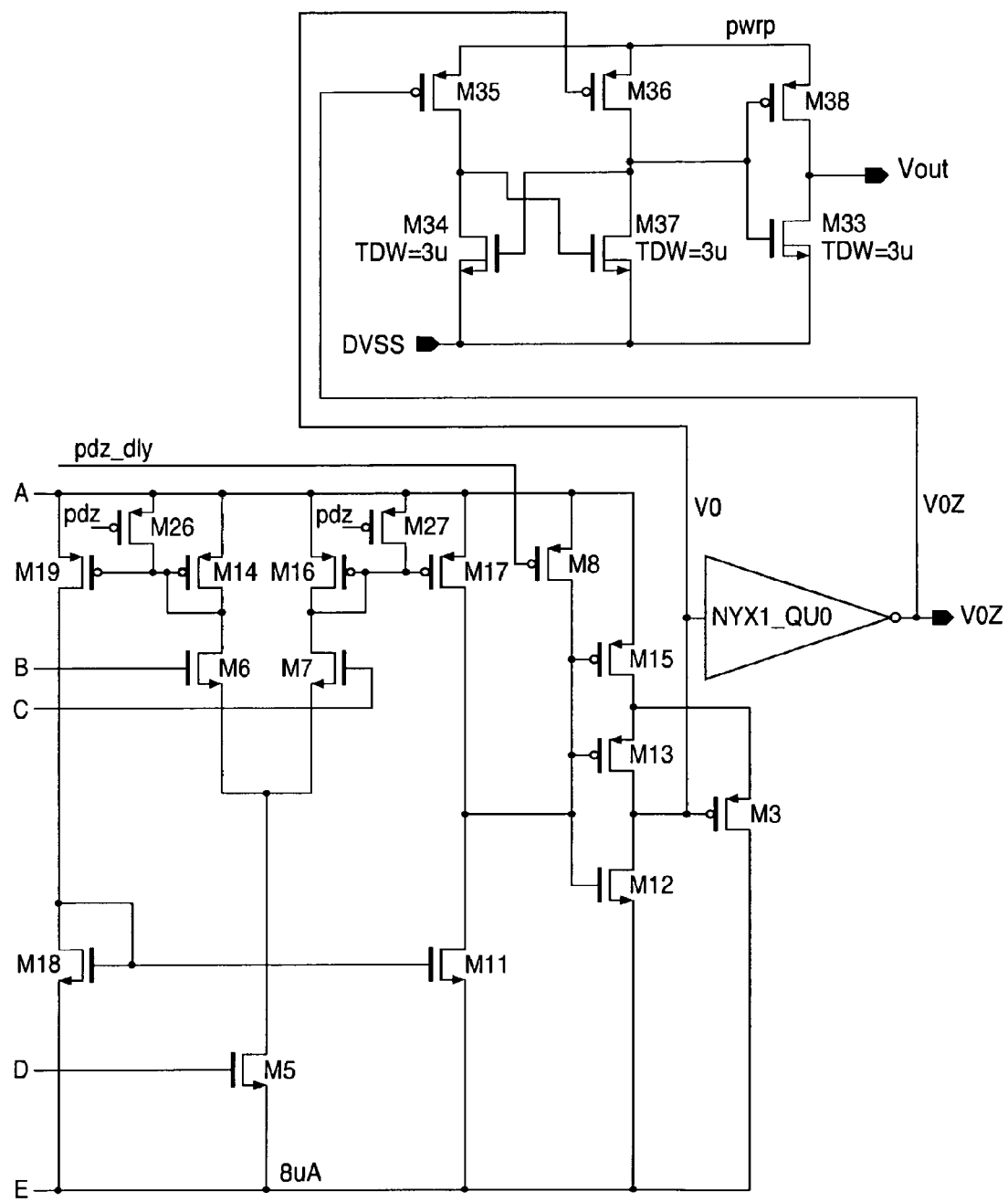

FIGS. 5A and 5B illustrate a schematic diagram of an advantageous embodiment of the second comparator circuit 230 of the invention. FIGS. 5A and 5B are similar to FIGS. 4A and 4B except that the Vim node is connected to the $V_{REF}$+DELT V input and the Vip node is connected to the tap signal on feedback line 190. In addition, the output stage of comparator 320 is held low for approximately one microsecond (1 μs) after the comparator 320 has been enabled. This is because when the comparator 320 is enabled (and the EN node goes from low to high), nodes a1 and a2 rise quickly from zero volts (0 V) to about two volts (2 V) and create a positive glitch on the tap signal. By holding the output of comparator 320 it is possible to prevent comparator 320 from falsely triggering during the enable glitch.

The Rdson of transistor M3 and the Rdson of transistor M4 together with the output voltage $V_{OUT}$ determine the magnitude of the currents that go through transistor M3 and transistor M4 when they are enabled. Transistor M3 and transistor M4 must be sized to be able to handle the peak current density rules of the process. It is noted that peak current density is normally twenty (20) times that of the steady state current density.

The smaller the size of the selected value of voltage (delta V or DELT V), the less overshoot and less undershoot is allowed at the output before transistor M3 or transistor M4 is activated. It is therefore desirable to choose a small value of voltage for delta V. However, the speed of the comparators (210 and 230) can limit how small a value of delta V can be realistically implemented. If the size of delta V is too small, then the comparator output may not have time to return to zero after being activated before the tap node is pushed or pulled below or above the reference voltage $V_{REF}$. If the comparators over-compensate in this way, the control loop could go into a sustained oscillation and bounce between the normal loop control and the transistor M3/transistor M4 push/pull mode of operation. A typical range of values for delta V is from two percent (2%) of the output voltage $V_{OUT}$ to five percent (5%) of the output voltage $V_{OUT}$.

In order for the switching regulator 200 to operate properly, the voltage drop on the feedback (FB) trace when transistor M3 or transistor M4 is activated has to be less than the delta V voltage. In prior art switching regulators the current that goes into the feedback signal is usually very small. The printed circuit board (PCB) trace for the feedback (FB) trace can be long and resistive. For this reason special care has to be used to reduce the printed circuit board (PCB) trace resistance (as well as the bondwire resistance) in the feedback line. In an alternate embodiment of the invention two feedback lines can be employed. The first feedback line is for the push/pull operation and the second feedback line is for sensing the output voltage. In the embodiment with two feedback lines the trace resistance problem is not an issue.

Figure 6:
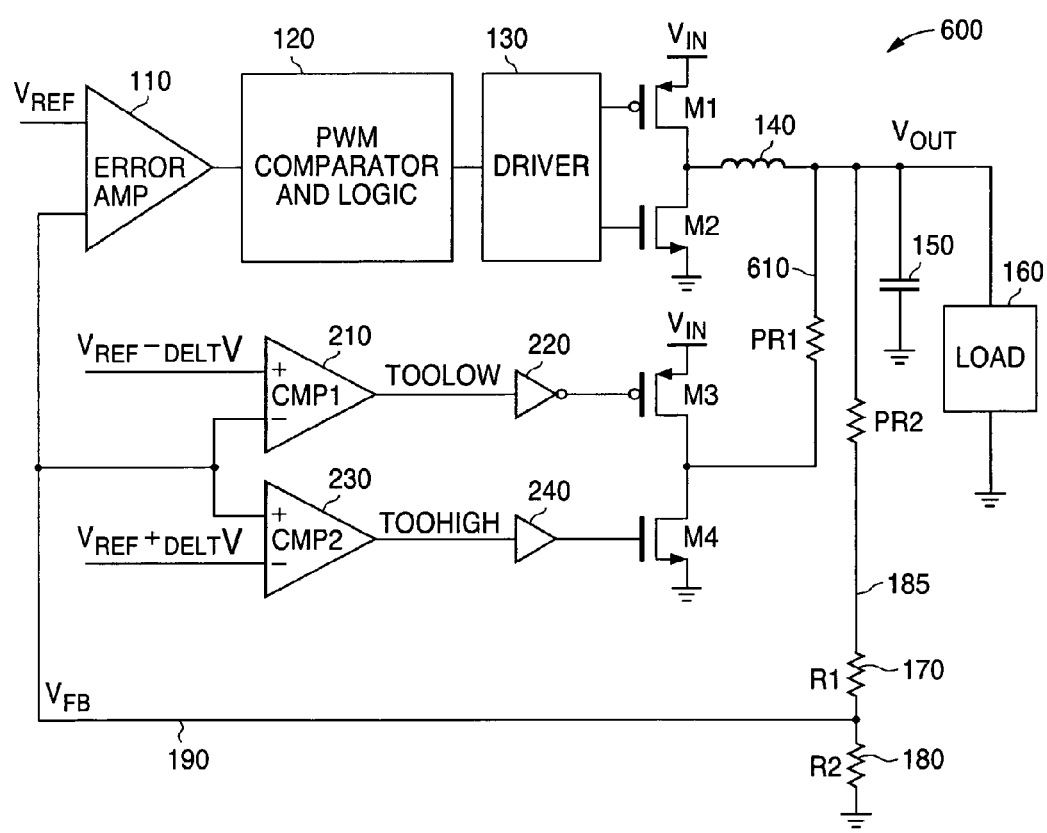
FIG. 6 illustrates schematic diagram of another advantageous embodiment of a switching regulator of the invention.

FIG. 6 illustrates a schematic diagram of an advantageous embodiment of a switching regulator 600 of the invention that has two feedback lines. Feedback line 610 connects the output of the switching regulator 600 to the drains of transistor M3 and transistor M4 for the push/pull operation. The resistance PR1 in the feedback line 610 represents the parasitic resistance in the printed circuit board (PCB) layout for feedback line 610.

Feedback line 185 connects the output of the switching regulator 600 to resistor 170 (resistor R1) for generating the tap signal for the feedback line 190. The resistance PR2 in the feedback line 185 represents the parasitic resistance in the printed circuit board (PCB) layout for feedback line 185.

Figure 7:
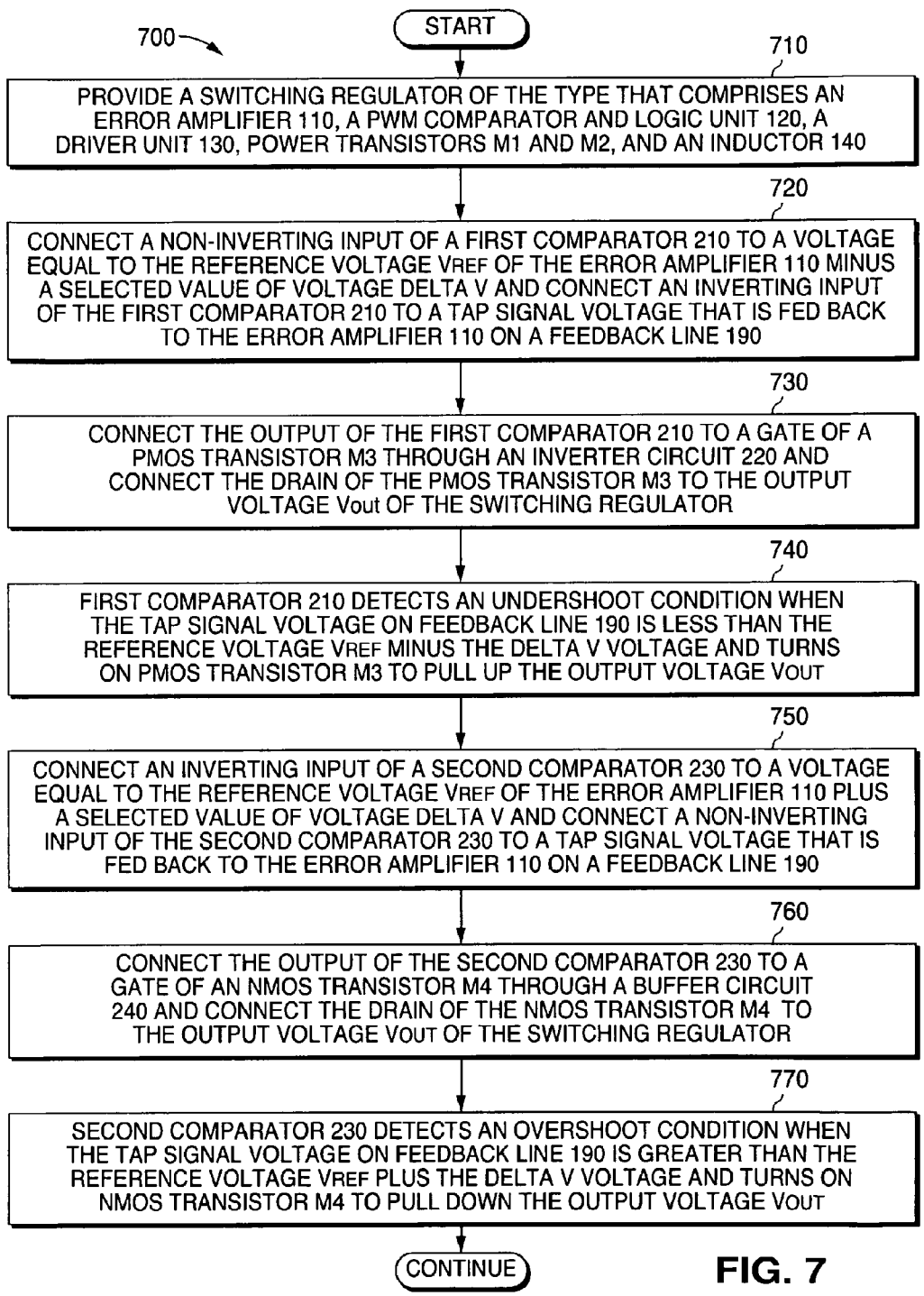
FIG. 7 illustrates a flow chart showing the steps of an advantageous embodiment of the method of the invention.

FIG. 7 illustrates a flow chart 700 showing the steps of an advantageous embodiment of the method of the invention. In the first step of the method a switching regulator is provided that comprises an error amplifier 110, a pulse width modulation (PWM) comparator and logic unit 120, a driver unit 130, power transistors M1 and M2, and an inductor 140 (step 710). Then a non-inverting input of a first comparator 210 is connected to a voltage that is equal to the reference voltage VREF of the error amplifier 110 minus a selected value of voltage "delta V" and an inverting input of the first comparator 210 is connected to a tap signal voltage that is fed back to the error amplifier 110 on a feedback line 190 (step 720).

Then the output of the first comparator 210 is connected to a gate of a PMOS transistor M3 through an inverter circuit 220 and the drain of the PMOS transistor M3 is connected to the output voltage $V_{OUT}$ of the switching regulator (step 730).

The first comparator 210 detects an undershoot condition of the output voltage $V_{OUT}$ when the tap signal voltage on the feedback line 190 is less than the reference voltage $V_{REF}$ minus the "delta V" voltage and the first comparator 210 turns on the PMOS transistor M3 to pull up the output voltage $V_{OUT}$ (step 740).

An inverting input of a second comparator 230 is connected to a voltage that is equal to the reference voltage VREF of the error amplifier 110 plus a selected value of voltage "delta V" and a non-inverting input of the second comparator 230 is connected to a tap signal voltage that is fed back to the error amplifier 110 on a feedback line 190 (step 750).

Then the output of the second comparator 230 is connected to a gate of an NMOS transistor M4 through a buffer circuit 240 and the drain of the NMOS transistor M4 is connected to the output voltage $V_{OUT}$ of the switching regulator (step 760). The second comparator 230 detects an overshoot condition of the output voltage $V_{OUT}$ when the tap signal voltage on the feedback line 190 is greater than the reference voltage $V_{REF}$ plus the "delta V" voltage and the second comparator 230 turns on the NMOS transistor M4 to pull down the output voltage $V_{OUT}$ (step 770).

Although the present invention has been described with an exemplary embodiment, various changes and modifications may be suggested to one skilled in the art. It is intended that the present invention encompass such changes and modifications as fall within the scope of the appended claims.

What is claimed is:

1. A switching regulator circuit comprising:
   a driver circuit configured to be connected to first and second transistors;
   a first circuit configured to control an undershoot of an output voltage of the switching regulator circuit, the first circuit comprising:
      a third transistor connected to an output of the switching regulator circuit; and
      a first comparator circuit comprising:
         an output that is connected to the third transistor;
         a first input configured to receive a tap signal voltage that is fed back to an error amplifier of the switching regulator circuit from the output of the switching regulator circuit: and
         a second input configured to receive a voltage signal that is equal to a reference voltage minus a selected value of voltage; and
   a second circuit configured to control an overshoot of the output voltage of the switching regulator circuit, the second circuit comprising a fourth transistor connected to the output of the switching regulator circuit.

2. The switching regulator circuit as set forth in claim 1 wherein the third transistor is configured to serve as a first current source.

3. The switching regulator circuit as set forth in claim 2 wherein the first comparator circuit is configured to detect an occurrence of the undershoot of the output voltage of the switching regulator circuit and activate the first current source to pull up the output voltage of the switching regulator circuit.

4. The switching regulator circuit as set forth in claim 3 wherein the first comparator circuit further comprises:
   a first stage comprising a plurality of p-type metal oxide semiconductor (PMOS) source followers; and
   a plurality of second stages following the first stage, wherein the second stages are fast high gain stages.

5. The switching regulator circuit as set forth in claim 1 wherein the first comparator circuit is further configured to detect the occurrence of the undershoot of the output voltage of the switching regulator circuit when the value of the tap signal voltage on the first input of the first comparator circuit is less than the reference voltage minus the selected value of voltage on the second input of the first comparator circuit.

6. The switching regulator circuit as set forth in claim 1 wherein the third transistor comprises a p-type metal oxide semiconductor transistor.

7. The switching regulator circuit as set forth in claim 2 wherein the first comparator circuit is further configured to receive the tap signal voltage via a first feedback line, and wherein an output of the first current source is provided to the output of the switching regulator circuit via a second feedback line.

8. The switching regulator circuit as set forth in claim 1 wherein the fourth transistor is configured to serve as a second current source, the second circuit further comprising a second comparator circuit having an output that is connected to the second current source.

9. The switching regulator circuit as set forth in claim 8 wherein the second comparator circuit is configured to detect an occurrence of the overshoot of the output voltage of the switching regulator circuit and activate the second current source to pull down the output voltage of the switching regulator circuit.

10. The switching regulator circuit as set forth in claim 9 wherein the second comparator circuit comprises:
    a first input configured to receive the tap signal voltage; and
    a second input configured to receive a voltage signal that is equal to the reference voltage plus the selected value of voltage.

11. The switching regulator circuit as set forth in claim 10 wherein the second comparator circuit is further configured to detect the occurrence of the overshoot of the output voltage of the switching regulator circuit when the value of the tap signal voltage on the first input of the second comparator circuit is less than the reference voltage plus the selected value of voltage on the second input of the second comparator circuit.

12. The switching regulator circuit as set forth in claim 1 wherein the fourth transistor comprises a n-type metal oxide semiconductor transistor.

13. The switching regulator circuit as set forth in claim 10 wherein the second comparator circuit is further configured to receive the tap signal voltage via a first feedback line, and wherein an output of the second current source is provided to the output of the switching regulator circuit via a second feedback line.

14. A method for controlling a switching regulator circuit that comprises a driver circuit connected to first and second transistors, the method comprising the steps of:
    detecting an occurrence of an undershoot of an output voltage of the switching regulator circuit, wherein the detecting comprises:
       providing a tap signal voltage that is fed back to an error amplifier of the switching regulator circuit to a first input of a first comparator circuit; and
       providing a voltage signal that is equal to a reference voltage minus a selected value of voltage to a second input of the first comparator circuit; and
    activating a first current source to pull up the output voltage of the switching regulator circuit, the first current source comprising a third transistor connected to an output of the switching regulator circuit.

15. The method as set forth in claim 14 wherein the step of detecting the occurrence of the undershoot further comprises the step of:
    detecting the occurrence of the undershoot of the output voltage of the switching regulator circuit when the value of the tap signal voltage on the first input of the first comparator circuit is less than the reference voltage minus the selected value of voltage on the second input of the first comparator circuit.

16. The method as set forth in claim 15 wherein the step of activating the first current source to pull up the output voltage of the switching regulator circuit comprises the step of:
sending a signal from the first comparator circuit to activate the third transistor to pull up the output voltage of the switching regulator circuit, wherein the third transistor is a p-type metal oxide semiconductor transistor.

17. The method as set forth in claim 14 further comprising the steps of:
detecting an occurrence of an overshoot of the output voltage of the switching regulator circuit; and
activating a second current source to pull down the output voltage of the switching regulator circuit, the second current source comprising a fourth transistor connected to the output of the switching regulator circuit.

18. The method as set forth in claim 17 wherein the step of detecting the occurrence of the overshoot comprises the steps of:
providing the tap signal voltage to a first input of a second comparator circuit;
providing a voltage signal that is equal to the reference voltage plus the selected value of voltage to a second input of the second comparator circuit; and
detecting the occurrence of the overshoot of the output voltage of the switching regulator circuit when the value of the tap signal voltage on the first input of the second comparator circuit is greater than the reference voltage plus the selected value of voltage on the second input of the second comparator circuit.

19. The method as set forth in claim 18 wherein the step of activating the second current source to pull down the output voltage of the switching regulator circuit comprises the step of:
sending a signal from the second comparator circuit to activate the fourth transistor to pull down the output voltage of the switching regulator circuit, wherein the fourth transistor is an n-type metal oxide semiconductor transistor.

20. A switching regulator circuit that comprises:
a driver circuit configured to be connected to first and second transistors;
a circuit configured to control an undershoot of an output voltage of the switching regulator circuit that comprises:
a first current source that is connected to an output of the switching regulator circuit, the first current source comprising a third transistor; and
a first comparator circuit configured to detect an occurrence of the undershoot of the output voltage of the switching regulator circuit and activate the first current source to pull up the output voltage of the switching regulator circuit, the first comparator circuit comprising:
an output that is connected to the third transistor:
a first input configured to receive a tap signal voltage that is fed back to an error amplifier of the switching regulator circuit from the output of switching regulator circuit; and
a second input configured to receive a voltage signal that is equal to a reference voltage minus a selected value of voltage; and
a circuit configured to control an overshoot of the output voltage of the switching regulator circuit that comprises:
a second current source that is connected to the output of the switching regulator circuit, the second current source comprising a fourth transistor; and
a second comparator circuit configured to detect an occurrence of the overshoot of the output voltage of the switching regulator circuit and activate the second current source to pull down the output voltage of the switching regulator circuit.

21. The switching regulator circuit as set forth in claim 20 wherein:
the first comparator circuit is configured to detect the occurrence of the undershoot of the output voltage of the switching regulator circuit by determining that the value of the tap signal voltage is less than the reference voltage minus the selected value of voltage; and
the second comparator circuit is configured to detect the occurrence of the overshoot of the output voltage of the switching regulator circuit by determining that the value of the tap signal voltage is greater than the reference voltage plus the selected value of voltage.

22. The switching regulator circuit as set forth in claim 21 wherein:
the third transistor comprises a p-type metal oxide semiconductor transistor; and
the fourth transistor comprises an n-type metal oxide semiconductor transistor.

23. The switching regulator circuit as set forth in claim 21:
wherein the first comparator circuit is configured to receive the tap signal voltage via a first feedback line, and wherein an output of the first current source is provided to the output of the switching regulator circuit via a second feedback line; and
wherein the second comparator circuit is configured to receive the tap signal voltage via the first feedback line, and wherein an output of the second current source is provided to the output of the switching regulator circuit via the second feedback line.

* * * * *